United States Patent
Shirakawa

(10) Patent No.: US 7,574,739 B2
(45) Date of Patent: Aug. 11, 2009

(54) PASSWORD AUTHENTICATING APPARATUS, METHOD, AND PROGRAM

(75) Inventor: Takahisa Shirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 780 days.

(21) Appl. No.: 10/951,056

(22) Filed: Sep. 28, 2004

(65) Prior Publication Data
US 2005/0071637 A1    Mar. 31, 2005

(30) Foreign Application Priority Data
Sep. 29, 2003    (JP)    ............... 2003-337798

(51) Int. Cl.
*H04L 9/32*    (2006.01)
*G06F 7/04*    (2006.01)

(52) U.S. Cl. .................. 726/19; 713/170; 713/183; 713/184

(58) Field of Classification Search ............... 726/19; 713/170, 183, 184
See application file for complete search history.

(56) References Cited

U.S. PATENT DOCUMENTS

| | | | | |
|---|---|---|---|---|
| 4,109,244 A * | 8/1978 | Barnich et al. | ............... | 345/469 |
| 5,478,976 A * | 12/1995 | Kano | ............... | 178/18.01 |
| 5,638,501 A * | 6/1997 | Gough et al. | ............... | 345/639 |
| 5,655,020 A * | 8/1997 | Powers | ............... | 713/185 |
| 6,209,104 B1 * | 3/2001 | Jalili | ............... | 726/18 |
| 6,441,808 B1 * | 8/2002 | Hashimoto | ............... | 345/173 |
| 7,065,645 B2 * | 6/2006 | Teicher | ............... | 713/167 |
| 7,065,786 B2 * | 6/2006 | Taguchi | ............... | 726/18 |
| 7,124,433 B2 * | 10/2006 | Little | ............... | 726/2 |
| 7,188,314 B2 * | 3/2007 | Mizrah | ............... | 715/741 |
| 7,308,652 B2 * | 12/2007 | Comfort et al. | ............... | 715/741 |
| 2001/0037468 A1 * | 11/2001 | Gaddis | ............... | 713/202 |
| 2002/0196274 A1 * | 12/2002 | Comfort et al. | ............... | 345/741 |
| 2004/0024710 A1 * | 2/2004 | Fernando et al. | ............... | 705/50 |
| 2004/0073809 A1 * | 4/2004 | Wing Keong | ............... | 713/201 |
| 2004/0177280 A1 * | 9/2004 | Maruyama et al. | ............... | 713/202 |

(Continued)

FOREIGN PATENT DOCUMENTS

JP    4-98389    3/1992

(Continued)

OTHER PUBLICATIONS

Japenese Office Action dated Jun. 17, 2008 with an English translaton.

*Primary Examiner*—David García Cervetti
(74) *Attorney, Agent, or Firm*—McGinn IP Law Group, PLLC

(57) ABSTRACT

In a password authenticating apparatus, a control section displays an image of a keyboard including multiple character keys on a display section. An input section sends input data to the control section on reception of an input of a position on a display screen. In connection with the displayed keyboard, the control section specifies a character corresponding to the input position as an input character, checks the input character against a character that forms a registered password, determines whether the input character is correct, and holds a determination result. Then, after the input character is determined, a display is changed to an image of the keyboard for receiving a next character input. Then, in connection with all characters that form the password, authentication is determined as being OK when all held determination results are correct.

20 Claims, 7 Drawing Sheets

U.S. PATENT DOCUMENTS

| | | | |
|---|---|---|---|
| 2005/0044425 A1* | 2/2005 | Hypponen | 713/202 |
| 2005/0057780 A1* | 3/2005 | Fujita et al. | 358/400 |
| 2006/0070011 A1* | 3/2006 | Matsuhara et al. | 715/816 |
| 2007/0198846 A1* | 8/2007 | Watari | 713/184 |
| 2009/0044282 A1* | 2/2009 | Govindaraju | 726/27 |

FOREIGN PATENT DOCUMENTS

| | | |
|---|---|---|
| JP | 2000-99801 | 4/2000 |

* cited by examiner

FIG.2

| CHARACTER CODE | KEYBOARD PATTERN |
|---|---|
| XX, XX, XX, ··· | 01 |
| XX, XX, XX, ··· | 02 |
| ⋮ | ⋮ |

FIG.3

| KEYBOARD PATTERN | IMAGE DATA OF KEYBOARD | COORDINATE RANGE DATA ||
| --- | --- | --- | --- |
| | | COORDINATE RANGE | CHARACTER CODE |
| 01 | A C E / F I P / R S W | RANGE OF X COORDINATES (X1 TO X2) AND Y COORDINATES (Y1 TO Y2) | xxxxx |
| | | ... | ... |
| 02 | δ H α / η V κ / Ω ν Φ | RANGE OF X COORDINATES (X1 TO X2) AND Y COORDINATES (Y1 TO Y2) | xxxxx |
| | | ... | ... |
| ... | ... | ... ||

(WHEN INPUT IS CORRECT)

(WHEN INPUT IS INCORRECT)

SINCE THERE IS NO "β", PRECEDING ERRONEOUS INPUT IS NOTICED

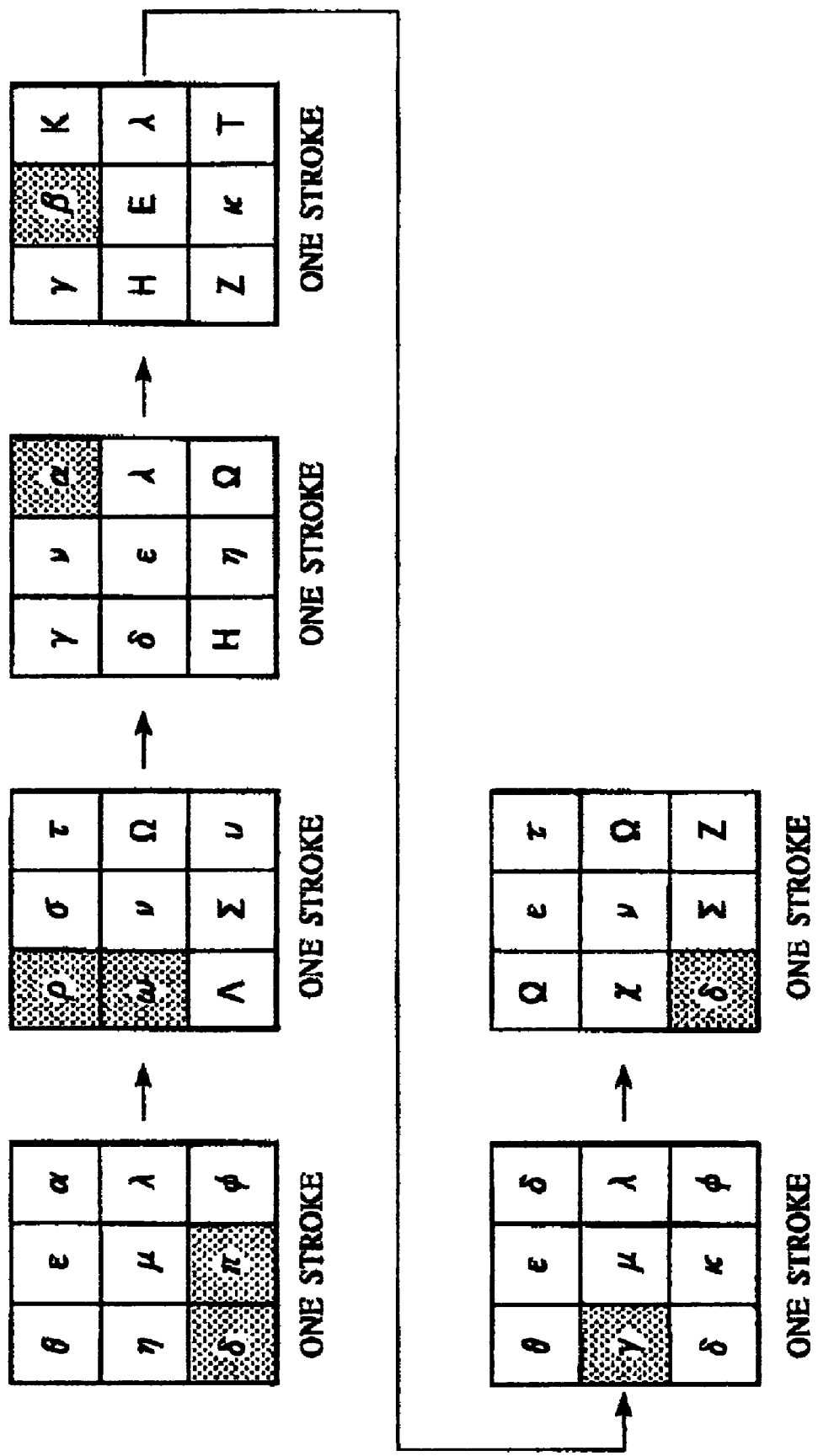

PASSWORD AUTHENTICATING APPARATUS, METHOD, AND PROGRAM

BACKGROUND OF THE INVENTION

1. Field of the Invention

The present invention relates to a password authenticating apparatus that performs authentication by a password input.

2. Description of the Related Art

In information equipment such as a cash dispenser and an information terminal that is set up at a convenience store, one that inputs a password using a software keyboard to perform individual authentication is frequently used. However, regarding the password input using the software keyboard, it has been pointed out that there is a danger in which a third person peeks into the password at an inputting time, and an input device for dealing with such a problem is proposed.

For example, there is an input apparatus that randomly changes a position of each numeric key of a numeric keypad displayed on a screen when a personal identification number input screen is displayed (Unexamined Japanese Patent Application KOKAI Publication No. 2000-99801).

However, the following problem is found out in the input method that randomly changes the key arrangement of the software keyboard at the password putting time. For example, in the case where the software keyboard having the same character types as those of the general keyboard is used, searching a key that an operator desires to input from the changed key arrangement becomes extremely burdensome to the operator since the number of character types is large. Moreover, in the case when only numeric characters input using the numeric keypad is allowed in order to reduce the operator's load, since te number of character types that forms the password is limited to the small number of character types, the effect of a peck prevention measure will be reduced and the safety of password will be decreased.

SUMMARY OF THE INVENTION

The present invention has been made with consideration given to the aforementioned circumstances, and an object of the present invention is to provide a password authenticating apparatus that is capable of performing password authentication with high safety and good operationality.

In order to attain the above object, a password authenticating apparatus according to a first aspect of the present invention includes a password storing section that stores a password. The password authenticating apparatus further includes a keyboard image storing section that stores an image of a keyboard including multiple character keys. The password authenticating apparatus further includes a display section that displays the image of the keyboard including the multiple character keys on a screen. The password authenticating apparatus further includes an input section that receives an input of a position on the screen where the image of the keyboard is displayed. The password authenticating apparatus further includes a character specifying section that specifies a character corresponding to the input position in connection with the keyboard displayed by the display section. The password authenticating apparatus further includes a determining section that checks the specified input character against a character that forms the password to determine whether the input character is correct and hold a determination result. The password authenticating apparatus further includes a display control section that reads the image of the keyboard for receiving an input of a next character from the keyboard image storing section to cause the display section to display the read image after determining the input character. The determining section determines that authentication is OK when all held determination results are correct in connection with all characters that form the password.

According to the above configuration, many kinds of characters (hiragana, katakana, kanji, numeral, alphabetical character and the like) are used as the password to make it possible to improve security, and, for example, the keyboard where the number of keys to be displayed on one screen is limited to the small number of keys is adopted to make it possible to input the password with good operationality.

Moreover, the password storing section stores the respective characters that form the password and the order of the characters in the password. The input section sequentially receives the input of the position on the screen where the image of the keyboard is displayed. The character specifying section specifies the character in the image of the keyboard corresponding to the position input by the input section in the order in which the character is input as an input character. The determining section checks the specified input character against the character that forms the password one by one in such a way to match the order in which the specified input character is input and the order in the password of the character that forms the password to determine whether the input character and the character that forms the password match each other one by one and hold a determination result as being positive when a match exists. The display control section causes the display section to display an image of the keyboard for receiving an input of a next character after one input character is determined by the determining section. The determining section determines that authentication is OK when all held determination results are correct in connection with all characters that form the password.

The display control section causes an image of the keyboard including a key of a character to be next checked in the password to be displayed as an image of the keyboard for receiving an input of a next character when one input character is determined as being correct by the determining section. The display control section randomly decides an image of the keyboard for receiving an input of a next character by a key other than the key of the character to be next checked in the password to cause the decided image to be displayed when one input character is determined as being incorrect by the determining section.

Accordingly, when there is an error in the input, the keyboard randomly decided is displayed, in which case a character to be next input is not displayed, so that the user can notice that there is an error in the preceding input even though the input character is not displayed on the screen.

Further, a password authenticating apparatus according to a second aspect of the present invention includes a password storing section that stores a password where characters are divided in collation unit. The password authenticating apparatus further includes a keyboard image storing section that stores an image of a keyboard of multiple character keys. The password authenticating apparatus further includes a display section that displays the image of the keyboard including the multiple character keys on a screen. The password authenticating apparatus further includes an input section that receives an input of a position on the screen where the image of the keyboard is displayed. The password authenticating apparatus her includes a character specifying section that specifies one or multiple characters corresponding to the position input by one input operation in the input section as an input character in connection with the keyboard displayed by the display section. The password authenticating apparatus further includes a determining section that checks the specified input character/characters against the character/characters in collation unit that forms/form the password to determine whether the input character/characters is/are correct and hold a determination result. The password authenticating apparatus further includes a display control section that reads an image of the keyboard for receiving an input of a next one or multiple characters from the keyboard image storing section to cause the display section to display the read image after determining the input character/characters. The determining section determines that authentication is OK when all held determination results are correct in connection with all characters that form the password.

According to the above configuration, many kinds of characters hiragana, katagana, kanji, numeral, alphabetical character and the like) are used as the password to make it possible to improve security, and, for example, the keyboard where the number of keys to be displayed on one screen is limited to the small number of keys is adopted to make it possible to input the password with good operationality.

The password storing section stores the characters divided in collation unit and the order of the character or characters in the password in collation unit. The input section sequentially receives the input of the position on the screen where the image of the keyboard is displayed. The character specifying section specifies one or multiple characters in the image of the keyboard corresponding to the position input by one input operation in the input section in the order in which the input operation is executed as one pair of input character/characters. The determining section checks one pair of the specified input character/characters against the character/characters in collation unit that forms/form the password in such a way to match the order in which one pair of the specified input character/characters is input and the order of the character/characters in collation unit that forms/form the password to determine whether the pair of the input character/characters and the character/characters in collation unit that forms/form the password t match each other and hold a determination result as being positive when a match exists. The display control section causes the display section to display an image of the keyboard for receiving an input of a next one or multiple characters after one pair of the input character/characters is determined by the determining section. The determining section determines that authentication is OK when all held determination results are correct in connection with character/characters in collation unit that forms/form the password.

The display control section causes an image of the keyboard including a key of a character to be checked in the password to be displayed as an image of the keyboard for receiving a next input when one pair of the input character/characters is determined as being correct by the determining section. The display control section randomly decides an image of the keyboard for receiving the next input by a key other than the key of the character to be next checked in the password to cause the decided image to be displayed when one pair of the input character/characters is determined as being incorrect by the determining section.

Accordingly, when there is an error in the input, the keyboard randomly decided is displayed, in which case a character to be next input is not displayed, so that the user can notice that there is an error in the preceding input even though the input character is not displayed on the screen.

A password authenticating apparatus according to a third aspect of the present invention includes password storing mean for storing a password. The password authenticating apparatus further includes display means for displaying an image of a keyboard including multiple character keys on a screen. The password authenticating apparatus further includes input means for receiving an input of a position on the screen where the image of the keyboard is displayed. The password authenticating apparatus further includes character specifying means or specifying a character corresponding to the input position as an input character in connection with the keyboard displayed by the display means. The password authenticating apparatus further includes determining means for checking the specified input character against a character that forms the password to determine whether the input character is correct and holding a determination result. The password authenticating apparatus further includes display control means for causing the display means to display an image of the keyboard for receiving an input of a next character after determining the input character. The determining means determines that authentication is OK when all held determination results are correct in connection with all characters that form the password.

According to the above configuration, many kinds of characters (hiragana, katakana, kanji, numeral, alphabetical character and the like) are used as the password to make it possible to improve security, and, for example, the keyboard where the number of keys to be displayed on one screen is limited to the small number of keys is adopted to make it possible to input te password with good operationality.

Furthermore, a password authentication method according to a fourth aspect of the present invention is a password authentication method that performs password authentication using a computer, and includes displaying an image of a keyboard including multiple character keys on a screen. The password authentication method further includes receiving an input of a position on the screen where the image of the keyboard is displayed. The password authentication method further includes specifying a character corresponding to the input position as an input character in connection with the displayed keyboard. The password authentication method further includes checking the specified input character against a character that forms a password to determine whether the input character is correct, and holding a determination result. The password authentication method further includes changing a display to an image of the keyboard for receiving an input of a next character after determining the input character. The password authentication method further includes determining that authentication is OK when all held determination results are correct in connection with all characters that form the password.

The password authentication method further includes storing the respective characters that form the password and the order of the respective characters arranged in the password in the computer, which storing is executed before the displaying the image of the keyboard. The receiving an input of a position is receiving one time the input of the position on the screen where the image of the keyboard is displayed. The specifying a character is specifying the character in the image of the keyboard corresponding to the position input in the receiving an input of a position, as one input character. The password authentication method further includes reading one character in the password arranged in the same order as the number of times receiving an input of a position is executed. The holding a determination result checks one specified input character against the read one character of the password to determine whether the input character matches the character of the password, and holds a determination result as being positive when a match exists. The receiving one time the input of the position, the specifying the input character, the reading one character of the password, and the holding the determination result are executed in the order of the respective characters that form the password, thereby obtaining the determination results of all characters that form the password.

A password authentication method according to a fifth aspect of the present invention is a password authentication method that performs password authentication using a computer, and includes displaying an image of a keyboard including multiple character keys. The password authentication method further includes receiving an instruction input of a position on a screen where the image of the keyboard is displayed. The password authentication method further includes specifying one or multiple characters corresponding to the position input by one input operation as an input character in connection with the displayed keyboard. The password authentication method further includes checking the specified input character/characters against a character/characters in collation unit that forms/form a password to determine whether the input character/characters is/are correct, and holding a determination result. The password authentication method her includes changing a display to an image of the keyboard for receiving an input of a next one or multiple characters after determining the input character. The password authentication method further includes determining that authentication is OK when all held determination results are correct in connection with all characters that form the password.

Then, the password authentication method further includes storing the respective character/characters in collation unit that forms/form the password and te order in collation units of the respective character/characters in collation unit in the computer which storing is executed before the displaying the image. The receiving an instruction input of a position is receiving the position input by one input operation on the screen where the image of the keyboard is displayed. The specifying one or multiple characters is specifying one or multiple characters in the image of the keyboard corresponding to the position input by one input operation in the receiving an instruction input of a position, as one pair of the input character/characters. The password authentication method further includes reading the character/characters in the password in collation unit arranged in the same order in the collation units as the number of times the receiving an instruction input of a position is executed. The holding a determination rest checks one pair of the specified input character/characters against the read character/characters in the password in collation unit to determine whether one pair of the input character/characters matches the character/characters in the password in collation unit, and holds a determination result as being positive when a match exists. The receiving the instruction input of the position, the specifying one pair of the input character/characters, the reading the character/characters in the password in collation unit, and the holding the determination result are executed in the order in collation units of the character/characters in collation unit that forms/form the password, thereby obtaining the determination results of all characters that form the password in collation unit.

Moreover, a program according to a sixth aspect of the present invention causes a computer to execute displaying an image of a keyboard including multiple character keys. The program further causes a computer to execute receiving an input of a position on a screen where the image of the keyboard is displayed. The program further causes a computer to execute specifying a character corresponding to the input position as an input character in connection with the displayed keyboard. The program further causes a computer to execute checking the specified input character against a character that forms a password to determine whether the input character is correct, and holding a determination result. The program further causes a computer to execute changing a display to an image of the keyboard for receiving an input of a next character after determining the input character. The program further causes a computer to execute determining that authentication is OK when all held determination results are correct in connection with all characters that form the password.

The program further causes the computer to execute storing the respective characters that form the password and the order of the respective characters arranged in the password in the computer, which storing is executed before the displaying the image of the keyboard. The receiving an input of a position is receiving one time the input of the position on the screen where the image of the keyboard is displayed. The specifying a character is specifying the character in the image of the keyboard corresponding to the position input in the receiving an input of a position, as one input character. The program further causes a computer to execute reading one character in the password arranged in the same order as the number of times the receiving an input of a position is executed. The holding a determination result checks one specified input character against the read one character in the password to determine whether the input character matches the character in the password, and holds a determination result as being positive when a match exists. The receiving one time the input of the position, the specifying the input character, the reading one character of the password, and the holding the determination result are executed in the order of the respective characters that form the password, thereby obtaining the determination results of all characters that form the password.

A program according to a seventh aspect of the present invention causes a computer to execute displaying an image of a keyboard including multiple character keys. The program further causes a computer to execute receiving an instruction input of a position on a screen where the image of the keyboard is displayed. The program further causes a computer to execute specifying one or multiple characters corresponding to the position input by one input operation as an input character/characters in connection with the displayed keyboard. The program further causes a computer to execute checking the specified input character/characters against a character/characters in collation unit that forms/form a password to determine whether the input character is correct, and holding a determination result. The program further causes a computer to execute changing a display to an image of the keyboard for receiving an input of a next one or multiple characters after determining the input character. The program further causes a computer to execute determining that authentication is OK when all held determination results are correct in connection with all characters that form the password.

The program causes the computer to execute storing the respective character/characters in collation unit that forms/form the password and the order in collation units of the respective character/characters in collation unit in the computer, which storing is executed before the displaying the image. The receiving an instruction input of a position is receiving the position input by one input operation on the screen where the image of the keyboard is displayed. The specifying one or multiple characters is specifying one or multiple characters in the image of the keyboard corresponding to the position input by one input operation in the receiving an instruction input of a position, as one pair of the input characters. The program farther causes the computer to execute reading the character/characters in the password in collation unit arranged in the same order in the collation units as the number of times the receiving an instruction input of a position is executed. The holding a determination result checks one pair of the specified input character/characters against the read character/characters in the password in collation unit to determine whether one pair of the input character/characters matches the character/characters of the password in collation unit, and holds a determination result as being positive when a match exists. The receiving the instruction input of the position, the specifying one pair of the input character/characters, the reading the characters of te password in collation unit, and the holding the determination result are executed in the order in collation units of the character/characters in collation unit that forms/form the password, thereby obeying the determination results of all characters that form the password in collation unit.

According to the present invention, there is provided a password authenticating apparatus with high safety and good operationality to a user.

BRIEF DESCRIPTION OF THE DRAWINGS

These objects and other objects and advantages of the present invention will become more apparent upon reading of the following detailed description and the accompanying drawings in which:

FIG. 2 is a view illustrating one example of a keyboard pattern table;

FIG. 3 is a view illustrating one example of image data and coordinate range data that are associated with a keyboard pattern;

FIG. 5 are views explaining changes in screen, where

FIG. 7 is a view specifically explaining authentication processing according to a second embodiment.

DETAILED DESCRIPTION OF THF PREFERRED EMBODIMENTS

The following will explain the password authenticating apparatus according to the embodiments of the present invention with reference to the drawings.

First Embodiment

Figure 1:
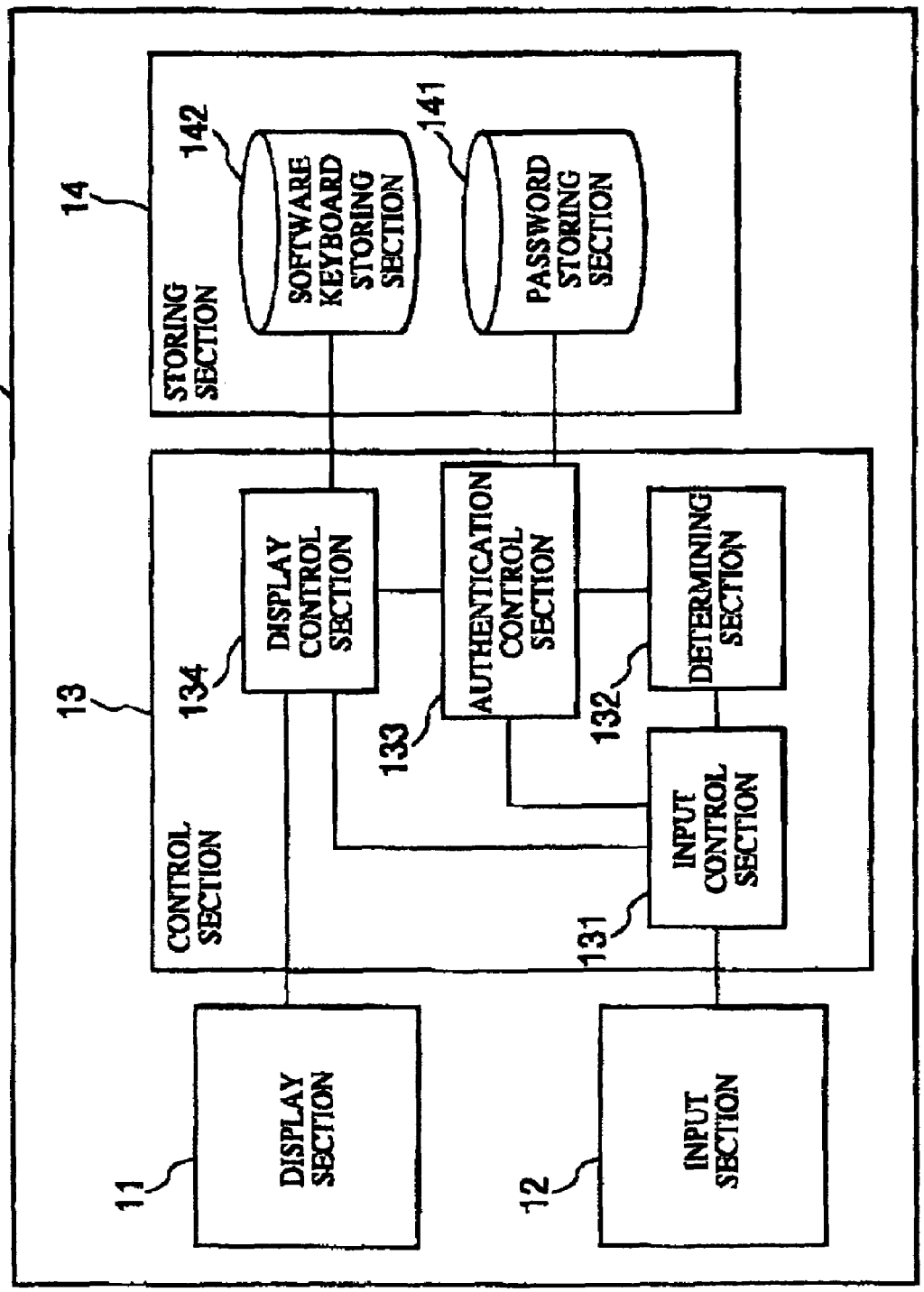
FIG. 1 is a view illustrating a configuration of a password authenticating apparatus according to a first embodiment of the present invention.

FIG. 1 illustrates a configuration example of a password authenticating apparatus according to a first embodiment of the present invention. As illustrated in the figure, a password authenticating apparatus 1 includes, for example, a display section 11, an input section 12, a control section 13, and a storing section 14.

The display section 11 includes a display device such as a display and the like. The display section 11 displays various kinds of images such as an image of a software keyboard and the like on a display screen according to instructions from the control section 13. Moreover, an ID input display for urging a user to input ID and receiving the input of ID by the user can be displayed on the display section 11.

The input section 12 receives the input to the password authenticating apparatus 1 by an operator (namely, "user") of the password authenticating apparatus 1. The input section 12 sends input data input by the user operation to the control section 13.

Various kinds of input devices can be provided in the input section 12. The password authenticating apparatus 1 can include a touch panel having a transparent sheet as the aforementioned input device.

The touch panel is placed on the display section 11 so that the user can confirm the characters and numerals displayed on the display section 11 in a plane form through the touch panel. Then, the user depresses a position on the touch panel corresponding to a position of a character and the like that the user desires to input with a finger or a pen, thereby a relatively two-dimensional position (coordinate data) of the character and the like on the display section 11 is input.

In this way, it is possible to input any one of multiple characters and the like included in the image of the software keyboard displayed on the display section 11. Furthermore, it is possible to input numerals and the like that specify the user ID based on the ID input display displayed on the display section.

The input section 12 can include an input device other than the touch panel. Moreover, the input section 12 can include a card reading device, other than the touch panel. Namely, when the card reading device is provided as the input device and a card (IC card, magnetic card) in which the ID is stored is set, the ID stored in the card is read by the card reading device, the user ID can be input to the input section 12.

The control section 13 includes a CPU (Central Processing Unit), a ROM (Read Only Memory), and a RAM (Random Access Memory), and controls the entirety of the main apparatus. The control section 13 reads an operation program prestored in the storing section 14 to execute the program, thereby logically implementing an input control section 131, a determining section 132, an authentication control section 133, and a display control section 134.

The input control section 131 executes processing for determining which character of the software keyboard is input by the user. More specifically, input data (coordinate data) received from the input section 12 is converted to a character code of the corresponding key with reference to coordinate range data indicating a coordinate range of each character key of the software keyboard displayed on the display section 11. Then, the converted character code is sent to the determining section 132. The coordinate range data of each character key of the software keyboard is supplied to the input control section 131 by the display control section 134.

The determining section 132 executes processing for determining whether each input character is correct by checking against the password. More specifically, the character codes received from the input control section 131 are checked against the respective characters that form the password to determine whether they match each other, and a determination result is supplied to the authentication control section 133. The determination is one in which determination whether the input characters match the respective characters that form the password is sequentially performed for each one input character against the respective character that forms the password. For example, when the character code of the first character is received from the input control section 131, the received character code is checked against the character code of the first character from the top of the password. Then, when the character code of the second character is received, the received character code is checked against the character code of the second character from the top of the password. Sequentially, when the character code of Nth character is received, the received character code is checked against the character code of Nth character from the top of the password.

The authentication control section 133 reads the password corresponding to, for example, the ID input by the user from a password storing section 141 when authentication is started. More detailed explanation can be given as follows. When the user ID is input from the input section 12, the ID data is input to the authentication control section 133 via the input control section 131. Then, the authentication control section 133 reads a password associated with the input ID data from the password storing section 141.

Furthermore, the authentication control section 133 performs processing in which the password is supplied to the determining section 132 and the character code of the top character of the password is supplied to the display control section 134.

Moreover, the authentication control section 133 receives the determination result of whether the input character input based on the software keyboard is correct, namely, whether the input character matches the original character of the password, from the determining section 132. The authentication control section 133 sequentially stores the received determination result in a work area of the storing section 14.

Furthermore, the authentication control section 133 performs processing for supplying the character code for specifying the software keyboard to be next displayed to the display control section 134. The authentication control section 133 repeats this processing until determination of all characters that form the password is completed. In this way, the authentication control section 133 finally performs processing for determining that authentication is OK or authentication is NG based on the determination result of each input character.

More specifically, when receiving the determination result of the input character from the determining section 132, the authentication control section 133 stores the determination result in the work area of the storing section 14. Then, when all characters input so far ae determined as being correct with reference to each determination result in the work area and the determination of all characters is not completed, a character code of a character next to the character checked this time in a character string that forms the password (namely, a character code of (N+1)th character when Nth character from the top of the password is checked this time) is supplied to the display control section 134. On the other hand, when all characters input so far are determined as being correct and the determination on all characters is completed, the authentication control section 133 determines that authentication is OK and ends the authentication processing.

Moreover, when any one of the characters input so far is determined as being incorrect with reference to each determination result in the work area of the storing section 14 and the determination of all characters is not completed, the authentication control section 133 supplies a character code of an arbitrary character other than a character next to the character checked this time in a character string that forms the password to the display control section 134. On the other hand, when any one of the characters input so far is determined as being incorrect and the determination on all characters is completed, the authentication control section 133 determines that authentication is NG and ends the authentication processing.

Additionally, in the case of determination as being NG, an arbitrary character to be supplied to the display control section 134 may be randomly decided using, for example, a random number. Furthermore, in supplying the arbitrary character to the display control section 134, after the arbitrary character is compared with a character next to the character checked this time and the arbitrary character is confirmed as being different from the character (when the character is the same, a character selection is executed again), the arbitrary character may be supplied to the display control section 134.

The display control section 134 performs processing in which image data of the software keyboard is supplied to the display section 11 and displayed thereon and coordinate range data is supplied to the input control section 131. The display control section 134 obtains image data and coordinate range data of the software keyboard in the following way.

The display control section 134 specifies a keyboard pattern of the software keyboard corresponding to the character code received from the authentication control section 133 with reference to a software keyboard storing section 142. Then, the display control section 134 reads image data and coordinate range data of the software keyboard that are associated with the specified keyboard pattern, and obtains image data and coordinate data of the software keyboard.

The storing section 14 is formed of a hard disk and the like, and includes the password storing section 141 and the software keyboard storing section 142.

The password storing section 141 stores the ID and the password to be associated with each other. Moreover, the password storing section 141 stores the respective characters that form the password and the order of each character that is counted from the top of the entire characters that form the password.

The software keyboard storing section 142 stores a table (keyboard pattern table) where the character code and the keyboard pattern of the software keyboard are associated with each other as illustrated in, for example, FIG. 2. Moreover, the software keyboard storing section 142 stores the keyboard pattern and image data and coordinate range data of the keyboard to be associated with one another as illustrated in, for example, FIG. 3.

Moreover, the storing section 14 includes a work area (not shown). In this work area, the determination result obtained by the determining section 132 as to whether the password input by the user is correctly performed is stored. The storage of the determination result is executed in such way that the authentication control section 133 stores the determination result received from the determining section 132 in the work area of the storing section 14.

Furthermore, the storing section 14 stores various kinds of operation programs executed by the control section 13 and various kinds of data necessary for processing.

Figure 4:
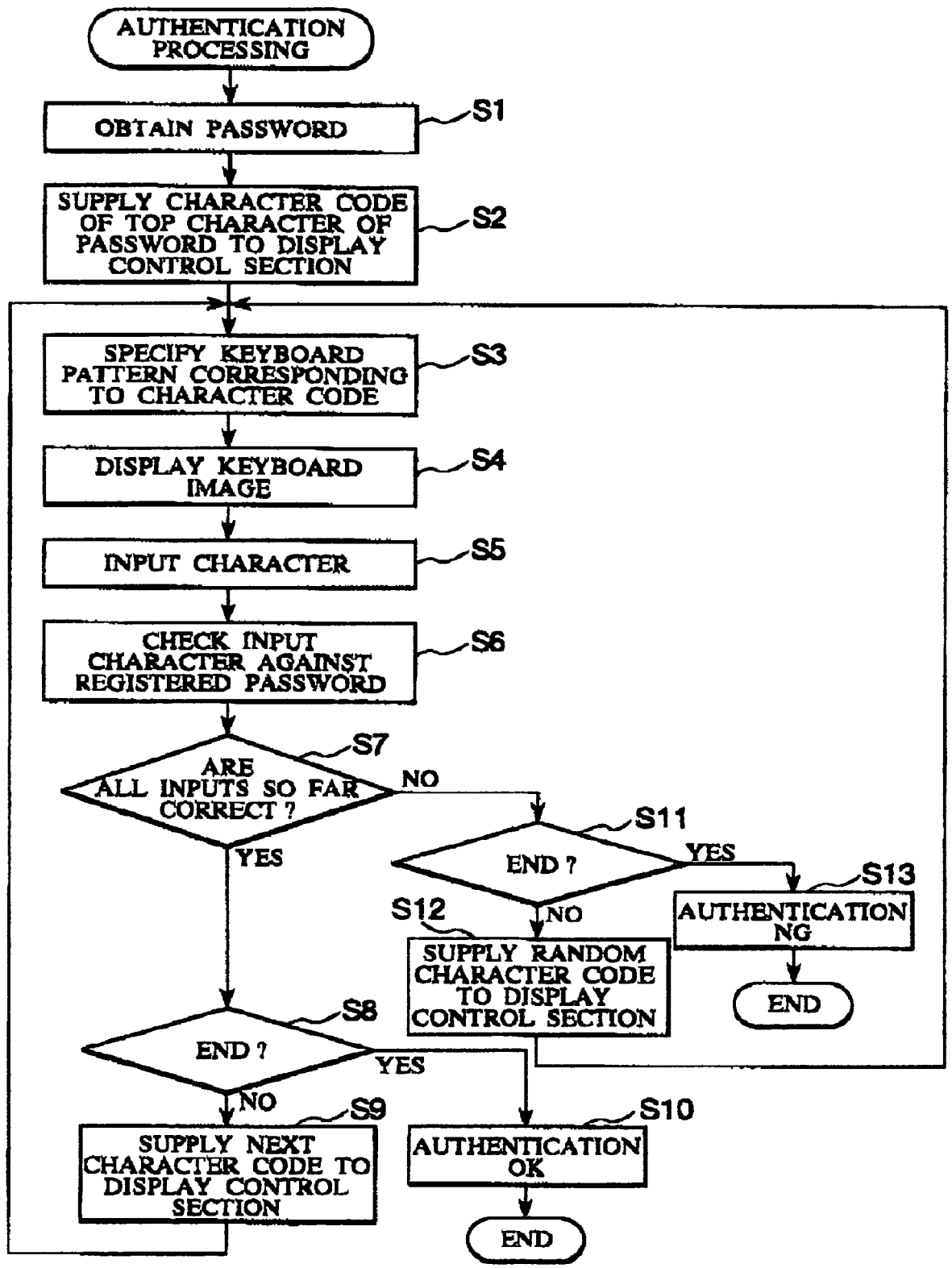
FIG. 4 is a flowchart explaining authentication processing according to a first embodiment.

An explanation will be next given of authentication processing by the password authenticating apparatus 1 according to the first embodiment of the present invention with reference to a flowchart in FIG. 4.

First of all, when receiving the input of ID by the user, the authentication control section 133 receives the input ID and reads the corresponding password from the password storing section 141 based on the received ID (step S1). Additionally, any ID inputting method may be possible, and, for example, the user inputs the ID in a state that the ID input screen on which the normal software keyboard is displayed is displayed, and the authentication control section 133 may obtain the input ID via the input control section 131. Moreover, the user may set the card (IC card, magnetic card and the like) where the ID is stored to the card reading device (not shown), the ID is read from the card reading device, and the read ID may be supplied to the authentication control section 133. Furthermore, the authentication control section 133 sends the obtained password to the determining section 132.

Next, the authentication control section 133 sends the character code of the top character of the password to the display control section 134 after performing a predetermined initial setting (N=1) (step S2).

The display control section 134 specifies the keyboard pattern corresponding to the received character code with reference to the keyboard pattern table of the software keyboard storing section 142 (step S3). Then, the display control section 134 reads image data and coordinate range data of the specified keyboard pattern from the software keyboard storing section 142, and supplies the image data to the display control section 134 to cause the display section 11 to display the image of the keyboard and supplies the coordinate range data to the input control section 131 (step S4).

Next, the user depresses the character key of the display screen from the top surface of the touch panel arranged on the display section 11 with his/her finger or a pen in order to input the password. Thereby, coordinates of one point on the displayed software keyboard is input. The input control section 131 obtains a character code corresponding to the input position coordinates with reference to the coordinate range data and sends the obtained character code to the determining section 132 (step S5).

The determining section 132 checks the received character code against the character code of a character to be checked (Nth character from the top) in the password to determine whether the input character is correct, and supplies a determination result to the authentication control section 133 (step S6).

The authentication control section 133 stores a determination result of Nth character in the work area of the storing section 14 and hen determines whether all characters (1 to Nth characters) input so far are correct with reference to each determination result stored in the work area (step S7).

When all characters input so far are correct (step S7: YES), the authentication control section 133 determines whether the determination of all characters that form the password is ended (for example, whether the result satisfies "the number of input characters=the number of characters of password") (step S8). When the determination is not finished (step S8: NO), a character code of a next character (namely, N+1)th character from the top of the password) in the character string that forms the password is supplied to the display control section 134 and 1 is add to N (step S9). Then, the processing flow goes back to step S3, and a keyboard pattern corresponding to the next character code is specified (step S3), the image of the keyboard is displayed (step S4), the character is input (step S5), and the input character and the password are checked against each other (step S6).

After that, when all characters input so far are determined as being correct in step S7 and it is determined that the determination of all characters that form the password is ended in step S8, authentication is determined as being OK, and, for example, the determination result is displayed (step S1), so that authentication processing is ended.

Moreover, when any one of the characters input so far is determined as being incorrect in step S7, the authentication control section 133 determines whether the determination on all characters that form the password is ended (for example, determination on whether the result satisfies "the number of input characters=the number of characters of password") (step S11). When the determination is not ended (step S11: NO), a character code of, for example, a randomly decided character (namely, any character other than (N+1)th character from the top of the password) is supplied to the display control section 134 and 1 is add to N (step S12). Then, the processing flow goes back to step S3, and the keyboard pattern corresponding to the next character codes is specified (step S3), the image of the keyboard is displayed (step S4), the character is input (step S5), and the input character and the password are checked against each other (step S6).

After that, when any one of the characters input so far is determined as being incorrect in step S7 and it is determined that the determination of all characters that for the password is ended in step S11 (step S11: YES), authentication is determined as being NG, and, for example, the determination result is displayed (step S13), so that authentication processing is ended.

Figure 5A:
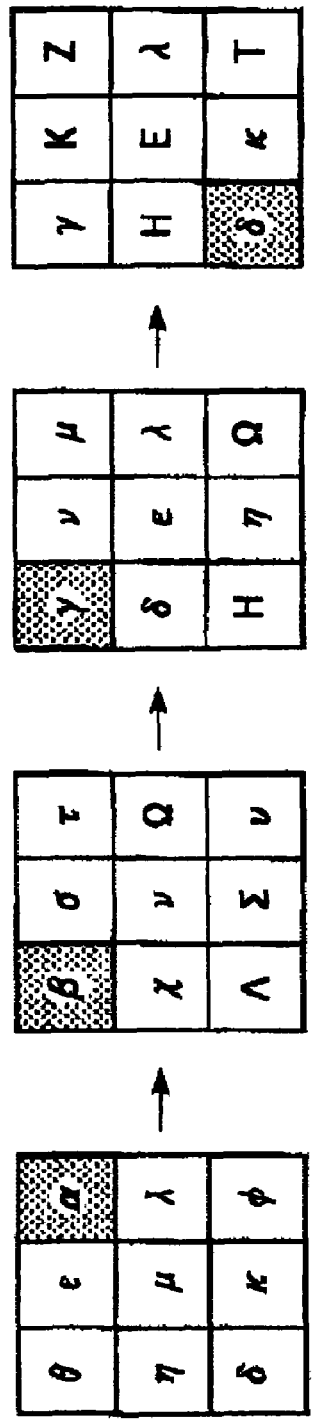
FIG. 5A shows a change of a case when an input is correct and FIG. 5B shows a change of a case when an input is incorrect.
Figure 5B:
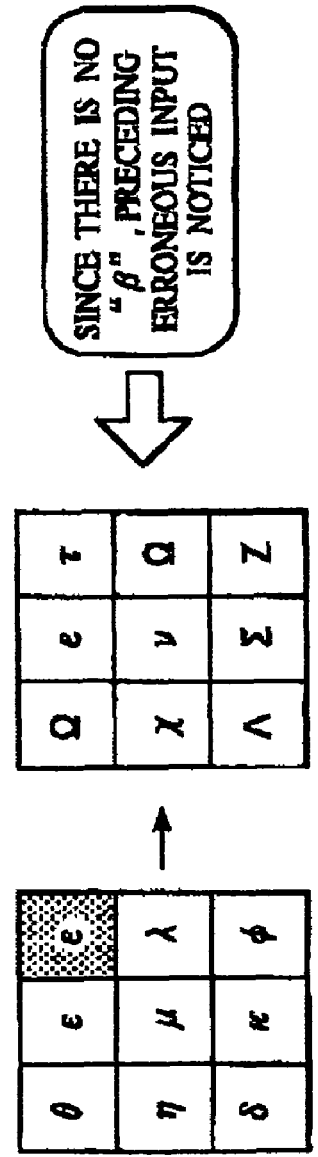

Accordingly, when there is even one error character in the input characters, the software keyboard corresponding to the randomly decided character code is displayed, in which case a character to be next input is not displayed. This makes it possible for the user to notice that there is an error in the preceding input even though the input character is not displayed on the screen. For example, as illustrated in FIG. 5A, in the case of the password "αβγδ", when the password is correctly input, image of the keyboard where the respective characters are selectable is sequentially displayed. However, when "ε" is erroneously selected on the input screen for the first character "α", an image of the keyboard that corresponds to a random character is displayed as shown in FIG. 5B. At this time, the user can notice that an erroneous input is made since there is no "β" in the image in the example of this figure.

Second Embodiment

The present invention is not limited to the aforementioned embodiment and various modifications and application may be possible. An explanation is next given of a password authenticating apparatus that performs authentication by not only collation of the characters that form the password but also information indicating the presence or absence of a character continuous input operation at the inputting time as a modification example of the present invention.

The password authenticating apparatus according to the second embodiment of the present invention has substantially the same function and configuration as those of the password authenticating apparatus of the first embodiment illustrated in FIG. 1, and the following mainly explains the difference therebetween.

The input control section 131 specifies a character code of the corresponding key in connection with coordinate date input with one stroke, namely one input operation (for example, in the case where a touch panel is used as an input apparatus, an input operation between touching the panel with a finger or a pen and releasing a finger or a pen from the panel is performed), with reference to coordinate range data. Then, the input control section 131 sends the character codes of one or multiple characters input with one stroke to the determining section 132.

In the case where the touch panel is used as the input apparatus, the input control section 131 specifies a character code/codes of the corresponding key/keys in connection with coordinate data input with one stroke against the touch panel, namely one input operation (an operation between pressing the panel with a finger or a pen and releasing a finger or a pen from the panel), with reference to the coordinate range data. Then, the input control section 131 sends the character code/codes of one or multiple characters input with one stroke to the determining section 132.

The determining section 132 checks the input characters against each other in stroke unit and supplies the determination result to the authentication control section 133. In this embodiment, in the password stored in the password storing section 141, a control code ("/" in the previous example) indicating a delimiter for collation unit is inserted between the characters as in, for example, "δπ/ρω/α/β/γ/δ". When receiving a character code/codes of a character/characters input by a first stroke from the input control section 131, the determining section 132 checks the received character code/codes against a character code/codes up to a first delimiter from the top password. Next, when receiving a character code/codes of a character/characters input by a second stroke, the determining section 132 checks the received character code/codes against a character code/codes between the first and second delimiters (control code) of the password. After that, when receiving a character code/codes of a character/characters input by a third stroke, the determining section 132 checks the received character code/codes against a character code/codes between the second and third delimiters of the password. Sequentially, when receiving a character code/codes of a character/characters input by Nth stroke, the determining section 132 checks the received character code/codes against a character code/codes between (N−1)th and nth delimiters of the password.

The authentication control section 133 performs processing for reading the password corresponding to ID input by, for example, a user from the password storing section 141 to supply to the determining section 132. Also, the authentication control section 133 performs processing for supplying the character code/codes of the character/characters up to the first delimiter from the top of the password to the display control section 134.

Moreover, the authentication control section 133 receives a determination result of whether the input character input based on the sole keyboard is correct from the determining section 132. The authentication control section 133 sequentially stores the received determination results in the work area of the storing section 14.

Furthermore, the authentication control section 133 performs processing for supplying a character code/codes for specifying a software keyboard to be next displayed to the display control section 134. The authentication control section 133 repeats this processing until determination on all characters of the password is completed. In this way, the authentication control section 133 finally performs processing for determining whether authentication is OK or NG based on the determination results of the respective inputs. Additionally, in this embodiment, when all inputs so far are determined as being correct and the determination is not yet completed, a character code/codes for a next delimiter (namely, a character code/codes between Nth and (N+1)th control codes when checking the character between (N−1)th and Nth control codes is ended) is supplied to the display control section 134. Moreover, when all inputs so far are determined as being incorrect and the determination is not yet completed, any character code/codes other than the character code/codes for a next delimiter is randomly decided and supplied to the display control section 134.

The display control section 134 performs processing in which image data of the software keyboard is supplied to the display section 11 to display and coordinate range data is supplied to the input control section 131. The display control section 134 obtains image data and coordinate range data of the software keyboard in the following way.

The display control section 134 specifies a keyboard pattern of the software keyboard corresponding to the character code/codes received from the authentication control section 133 with reference to the software keyboard storing section 142. Then, the display control section 134 reads image data and coordinate range data of the software keyboard that are associated with the specified keyboard pattern from the software keyboard storing section 142, and obtain image data and coordinate data of the software keyboard.

Additionally, the software keyboard storing section 142 stores a table (keyboard pattern table) where the character code/codes of one or multiple characters (character code/codes of the character/characters in collation unit) and the keyboard pattern of the software keyboard are associated with each other. Moreover, among image data of the software keyboard stored in the software keyboard storing section 142, the software keyboard corresponding to the character codes of multiple characters (for example, "δπ") is provided so that character keys are arranged in such a way that the respective characters (for example, "δ" and "π") are adjacent to each other.

Figure 6:
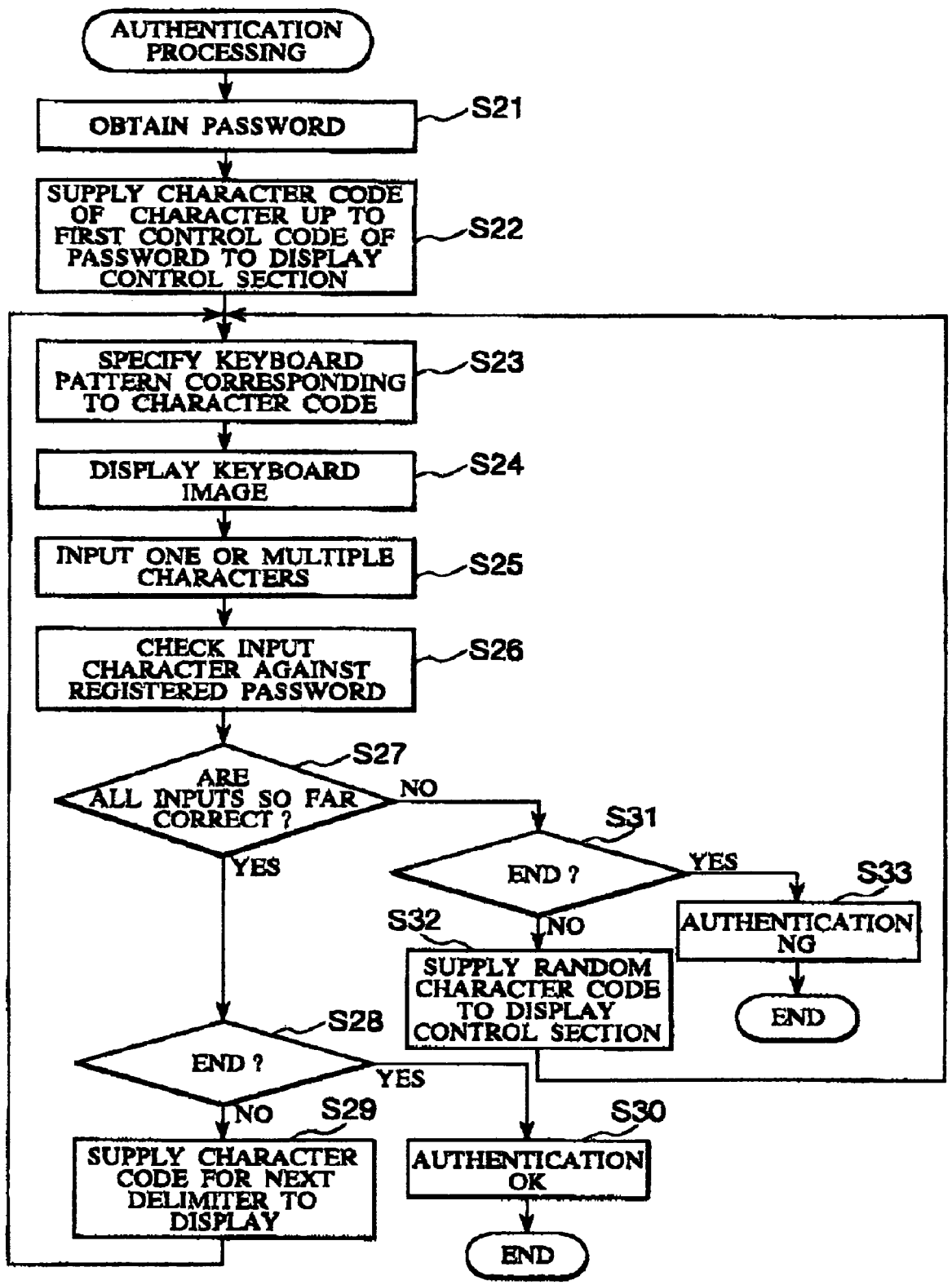
FIG. 6 is a flowchart explaining authentication processing according to a second embodiment.

An explanation will be next given of authentication processing by the password authenticating apparatus 1 according to the second embodiment of the present invention with reference to a flowchart in FIG. 6.

The authentication control section 133 receives an ID input by the user and reads the corresponding password from the password storing section 141 based on the received ID (step S21). Additionally, any ID inputting method may be possible, similar to the first embodiment.

Next, the authentication control section 133 sends a character code/codes of the character/characters up to a first control code from the top of the password to the display control section 134 after performing a predetermined initial setting (N=1) (step S22).

The display control section 134 specifies a keyboard pattern corresponding to the received character code/codes with reference to the keyboard pattern table of the software keyboard (step S23). Then, image data and coordinate range data corresponding to the specified keyboard pattern are read from the software keyboard storing section 142. The image data is supplied to the display control section 134 so that the image of the keyboard is displayed on the display section 11 and coordinate range data is supplied to the input control section 131 (step S24).

Next, in order to input the password, the user inputs the character key/keys of one or multiple characters placed on the display screen with his/her finger or a pen from a top surface of the touch panel provided at the display section 11. In connection with the coordinate data input with one stoke, the input control section 131 obtains an input character code/codes corresponding to the position coordinate and sends the obtained character code/codes to the determining section 132 with reference to coordinate range data (step S25).

The determining section 132 checks the received character code/codes of the input character/characters corresponding to one stroke against the character code/codes (character code/codes between (N−1)th and Nth control codes) to be checked in the password to determine whether the input character/characters is/are correct, and supplies a determination result to the authentication control section 133 (step S26).

The authentication control section 133 stores a determination result at the time of Nth collation, and then determines whether inputs so far (characters by the first to Nth strokes) are all correct with reference to the respective determination results stored in the work area of the storing section 14 (step S27).

When all inputs so far are correct (step S27: YES), the authentication control section 133 determines whether the determination of all characters that form the password is ended (for example, determination on whether the result satisfies the number of input characters=the number of characters of the password) (step S28). When the determination is not ended (step S28: NO), a character code/codes for a next delimiter (namely, a character code/codes between Nth and (N+1)th control codes) is supplied to the display control section 134 and N is added to 1 (step S29). Then, the processing flow goes back to step S23, and as mentioned above, the keyboard pattern corresponding to the character code/codes of one or multiple characters is specified (step S23), the image of the keyboard is displayed (step S24), the character/characters is/are input (step S25), and the input character and the password are checked against each other (step S26).

After that, when all characters input so far are determined as being correct in step S27 and it is determined that the determination of all characters that form the password is ended in step S28 (step S28: YES), authentication is determined as being OK, and, for example, the determination result is displayed (step S30), so that authentication processing is ended.

Moreover, when any one of the characters input so far is determined as being incorrect in step S27 (step S27: NO), the authentication control section 133 determines whether the determination of all characters that form the password is ended (for example, determination on whether the result satisfies "the number of input characters the number of characters of password") (step S31). When the determination is not ended (step S31: NO), for example, a randomly decided character code/codes (namely, any character code/codes other than the character codes between Nth and (N+1)th character codes of the password) are supplied to the display control section 134 and 1 is add to N (step S32). Then, the processing flow goes back to step S23, and as mentioned above, the keyboard pattern corresponding to the character code/codes of one or multiple characters is/are specified (step S23), the image of the keyboard is displayed (step S24), the character is input (step S25), and the input character and the password are checked against each other (step S26).

After that, when any of the characters input so far is/are determined as being incorrect in step S27 and it is determined that the determination of all characters that form the password is ended in step S31 (step S31: YES), authentication is determined as being NG, and, for example, the determination result is displayed (step S33), so that authentication processing is ended.

As explained above, the password authenticating apparatus according to the second embodiment performs checking on the input character/characters in stroke unit. Accordingly, in the case where the password is "δπ/ρω/α/β/γ/δ", as shown in FIG. 7, the user slides his/her finger on the touch panel to input "δπ" and "ρω" with one stroke and input each of "α", "β", "γ", "δ" with one stroke, so that authentication is determined as being OK. This nes it possible to improve security since it is difficult to estimate a delimiter position of the stroke even if the password, which can be easily estimated, (for example, name) is used. Furthermore, since it is difficult for a third person to see the detailed movement of user's hand such as whether user's finger touches the panel even if he/she takes a peek, it is possible to improve security.

Additionally, in the first and second embodiments, a password input ending key may be prepared on the software key board in order to keep the number of characters of the password secret. In this case, determination on whether inputting is ended as in steps S8, S11, S28 and S31 in the flowchart of FIGS. 4 and 6 is not executed, authentication OK processing or authentication NG processing may be executed based on the respective determination results stored in the work storage in response to the fact that the password input ending key on the software keyboard is depressed.

Moreover, an input return key for returning a checking character/characters by one inputting may be prepared on the software keyboard. In this case, when the user notices an erroneous input and depresses the input return key in response to the depression, the control section 13 performs interruption processing in which 1 is subtracted from N and te finally input determination result is cleared in the flowcharts of FIGS. 4 and 6. Thereafter, the control section 13 may move processing to steps S3 and S23 to receive the input of one previous character again.

Furthermore, though the aforementioned embodiment stores image data of the software keyboard in advance, the present invention is not limited to this. For example, every time when the display control section 134 receives a character code/codes of a character/characters to be next checked, the display control section 134 may generate such an image of the keyboard that includes the character/characters to supply to the display section 11.

Moreover, not only the character but also an icon, a pictorial symbol, an image may be used as the password. In this case, the software keyboard having the respective keys, which indicate the icon, pictorial symbol, image, is stored in the storing section 14. Then, the control section 13 sequentially performs checking on the codes of such as the icon, pictorial symbol, image corresponding to the keys input from the displayed software keyboard by the user, and executes authentication based on the determination result. Such a configuration allows children who cannot read characters to operate this authenticating apparatus, and is helpful for linguistic areas where the number of character kinds is small to make the password extremely complicated. Moreover, the plot of the story can be used as the password. Characters used for a password may include numerals, icons, pictographic characters, images, etc. other than letters such as alphabets.

Furthermore, though the above embodiment is configured to use multiple IDs and passwords, the present invention is not limited to this. Authentication of one password may be executed without using the ID.

Moreover, the input device is not limited to the touch panel, and various types of coordinate input devices, coordinate reading devices and the like can be applied. Other digitizers and write pens and the like may be used.

Furthermore, though the above embodiment explains that the determining section 132 receives all characters of the password in the authentication processing, the present invention is not limited to this. The authentication control section 133 may supply only the character/characters to be checked to the determining section 132, and the determining section 132 may check the supplied character/characters.

Moreover, though the above embodiment explains th one keyboard pattern is associated with the character code/codes, the present invention is not limited to this. Multiple keyboard patters may be associated with the character code/codes, and one keyboard pattern may be selected from the multiple patterns to use.

As explained above, according to the present invention, many kinds of characters (hiragana, katakana, kanji, numeral, alphabetical character and the like) are used as the password to make it possible to improve security, and the number of keys to be displayed on one screen is limited to the small number of keys to make it possible to maintain a fixed operationality.

Additionally, the system of the present invention may be implemented by a general computer system instead of a dedicated system. Moreover, for example, it is possible to configure the password authenticating apparatus in which a program for executing the aforementioned operation is stored in a computer-readable recording median (FD, CD-ROM, DVD, etc.) and distributed and the program is installed onto a computer to execute the aforementioned processing. Furthermore, the program may be stored in a disk device, which a server apparatus on a network such as the Internet has, and downloaded on, for example, the computer.

Moreover, in the case where the aforementioned function is implemented by OS or the cooperation of OS and an application part other than OS may be stored in the recording medium and distributed, and may be downloaded onto the computer.

Various embodiments and changes may be made thereunto without depart from the broad spirit and scope of the invention. The above-described embodiments are intended to illustrate te present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-337798 filed on Sep. 29, 2003 and including specification, claims, drawings and summary. The disclosure of the above Japanese Patent Application is incorporated herein by reference in its entirety.

What is claimed is:

1. A password authenticating apparatus comprising:
    a password storing section that stores a password;
    a keyboard image storing section that stores an image of a keyboard including multiple character keys;
    a display section that displays the image of the keyboard including the multiple character keys on a screen;
    an input section that receives an input of a position on the screen where the image of the keyboard is displayed;
    a character specifying section that specifies a character corresponding to the input position in connection with the keyboard displayed by the display section;
    a determining section that checks the specified input character against a character that forms the password to determine whether the input character is correct and hold a determination result; and
    a display control section that reads the image of the keyboard for receiving an input of a next character from the keyboard image storing section to cause the display section to display the read image after determining the input character, and
    wherein the determining section determines that authentication is OK when all held determination results are correct in connection with all characters that form the password.

2. The password authenticating apparatus according to claim 1, wherein:
    the password storing section stores the respective characters that form the password and the order of the characters in the password;
    the input section sequentially receives the input of the position on the screen where the image of the keyboard is displayed;
    the character specifying section specifies the character in the image of the keyboard corresponding to the position input by the input section in the order in which the character is input as an input character;
    the determining section checks the specified input character against the character that forms the password one by one in such a way to match the order in which the specified input character is input and the order in the password of the character that forms the password to determine whether the input character and the character that forms the password match each other one by one and hold a determination result as being positive when a match exists;
    the display control section causes the display section to display an image of the keyboard for receiving an input of a next character after one input character is determined by the determining section; and
    the determining section determines that authentication is OK when all held determination results are correct in connection with all characters that form the password.

3. The password authenticating apparatus according to claim 2, wherein the display control section causes an image of the keyboard including a key of a character to be next checked in the password to be displayed as an image of the keyboard for receiving an input of a next character when one input character is determined as being correct by the determining section, and randomly decides an image of the keyboard for receiving an input of a next character by a key other than the key of the character to be next checked in the password to cause the decided image to be displayed when one input character is determined as being incorrect by the determining section.

4. The password authenticating apparatus of claim 1, wherein the keyboard image storing section stores a plurality of different images of a keyboard including multiple character keys.

5. The password authenticating apparatus of claim 4, wherein the display control section causes a first of the plurality of different images to be displayed on the screen prior to determining the input character and a second of the plurality of different images to be displayed on the screen after determining the input character.

6. The password authenticating apparatus of claim 4, wherein the display control section causes the screen to display a first of the plurality of different images prior to determining the input character, a second of the plurality of different images if the determination result is correct, and a third of the plurality of images if the determination result is not correct.

7. The password authenticating apparatus of claim 1, wherein the determining section supplies a character to the display control section based on the determination result.

8. The password authenticating apparatus of claim 7, wherein the image of the keyboard includes the character supplied by the determining section.

9. A password authenticating apparatus comprising:
    a password storing section that stores a password where characters are divided in collation unit;
    a keyboard image storing section that stores an image of a keyboard of multiple character keys;
    a display section that displays the image of the keyboard including the multiple character keys on a screen;
    an input section that receives an input of a position on the screen where the image of the keyboard is displayed;
    a character specifying section that specifies one or multiple characters corresponding to the position input by one input operation in the input section as an input character in connection with the keyboard displayed by the display section;
    a determining section that checks the specified input character/characters against the character/characters in collation unit that forms/form the password to determine whether the input character/characters is/are correct and hold a determination result; and
    a display control section that reads an image of the keyboard for receiving an input of a next one or multiple characters from the keyboard image storing section to cause the display section to display the read image after determining the input character/characters, and wherein the determining section determines that authentication is OK when all held determination results are correct in connection with all characters that form the password.

10. The password authenticating apparatus according to claim 9, wherein:

the password storing section stores the characters divided in collation unit and the order of the character or characters in the password in collation unit;

the input section sequentially receives the input of the position on the screen where the image of the keyboard is displayed;

the character specifying section specifies one or multiple characters in the image of the keyboard corresponding to the position input by one input operation in the input section in the order in which the input operation is executed as one pair of input character/characters;

the determining section checks one pair of the specified input character/characters against the character/characters in collation unit that forms/form the password in such a way to match the order in which one pair of the specified input character/characters is input and the order of the character/characters in collation unit that forms/form the password to determine whether the pair of the input character/characters and the character/characters in collation unit that forms/form the password match each other and hold a determination result as being positive when a match exists;

the display control section causes the display section to display an image of the keyboard for receiving an input of a next one or multiple characters after one pair of the input character/characters is determined by the determining section; and the determining section determines that authentication is OK when all held determination results are correct in connection with character/characters in collation unit that forms/form the password.

11. The password authenticating apparatus according to claim 10, wherein the display control section causes an image of the keyboard including a key of a character to be checked in the password to be displayed as an image of the keyboard for receiving a next input when one pair of the input character/characters is determined as being correct by the determining section, and randomly decides an image of the keyboard for receiving the next input by a key other than the key of the character to be next checked in the password to cause the decided image to be displayed when one pair of the input character/characters is determined as being incorrect by the determining section.

12. A password authenticating apparatus comprising:

password storing means for storing a password;

display means for displaying an image of a keyboard including multiple character keys on a screen;

input section for receiving an input of a position on the screen where the image of the keyboard is displayed;

character specifying means for specifying a character corresponding to the input position as an input character in connection with the keyboard displayed by the display section;

determining means for checking the specified input character against a character that forms the password to determine whether the input character is correct and holding a determination result; and display control means for causing the display means to display an image of the keyboard for receiving an input of a next character after determining the input character, and wherein the determining means determines that authentication is OK when all held determination results are correct in connection with all characters that form the password.

13. A password authentication method that performs password authentication using a computer, said method comprising:

displaying an image of a keyboard including multiple character keys on a screen;

receiving an input of a position on the screen where the image of the keyboard is displayed;

specifying a character corresponding to the input position as an input character in connection with the displayed keyboard;

checking the specified input character against a character that forms a password to determine whether the input character is correct and holding a determination result;

changing a display to an image of the keyboard for receiving an input of a next character after determining the input character; and determining on a processor computer that authentication is OK when all held determination results are correct in connection with all characters that form the password.

14. The password authentication method according to claim 13, wherein:

said method further comprises storing the respective characters that form the password and the order of the respective characters arranged in the password in the computer, which storing is executed before said displaying the image of the keyboard;

said receiving an input of a position is receiving one time the input of the position on the screen where the image of the keyboard is displayed;

said specifying a character is specifying the character in the image of the keyboard corresponding to the position input in said receiving an input of a position, as one input character;

said method further comprises reading one character in the password arranged in the same order as the number of times said receiving an input of a position is executed;

said holding a determination result checks one specified input character against the read one character of the password to determine whether the input character matches the character of the password, and holds a determination result as being positive when a match exists; and said receiving one time the input of the position, said specifying the input character, said reading one character of the password, and said holding the determination result are executed in the order of the respective characters that form the password, thereby obtaining the determination results of all characters that form the password.

15. A password authentication method that performs password authentication using a computer, said method comprising:

displaying an image of a keyboard including multiple character keys on a screen;

receiving an instruction input of a position on a screen where the image of the keyboard is displayed;

specifying one or multiple characters corresponding to the position input by one input operation as an input character in connection with the displayed keyboard;

checking the specified input character/characters against a character/characters in collation unit that forms/form a password to determine whether the input character/characters is/are correct and holding a determination result;

changing a display to an image of the keyboard for receiving an input of a next one or multiple characters after determining the input character; and determining on a processor computer that authentication is OK when all held determination results are correct in connection with all characters that form the password.

16. The password authentication method according to claim 15, wherein:

said method further comprises storing the respective character/characters in collation unit that forms/form the password and the order in collation units of the respective character/characters in collation unit in the computer, which storing is executed before said displaying the image;

said receiving an instruction input of a position is receiving the position input by one input operation on the screen where the image of the keyboard is displayed;

said specifying one or multiple characters is specifying one or multiple characters in the image of the keyboard corresponding to the position input by one input operation in said receiving an instruction input of a position, as one pair of the input character/characters;

said method further comprises reading the character/characters in the password in collation unit arranged in the same order in the collation units as the number of times said receiving an instruction input of a position is executed;

said holding a determination result checks one pair of the specified input character/characters against the read character/characters in the password in collation unit to determine whether one pair of the input character/characters matches the character/characters in the password in collation unit and holds a determination result as being positive when a match exists; and said receiving the instruction input of the position, said specifying one pair of the input character/characters, said reading the character/characters in the password in collation unit, and said holding the determination result are executed in the order in collation units of the character/characters in collation unit that forms/form the password, thereby obtaining the determination results of all characters that form the password in collation unit.

17. A programmable storage medium tangibly embodying a program causing a computer to execute a sequence comprising:

displaying an image of a keyboard including multiple character keys;

receiving an input of a position on a screen where the image of the keyboard is displayed;

specifying a character corresponding to the input position as an input character in connection with the displayed keyboard;

checking the specified input character against a character that forms a password to determine whether the input character is correct and holding a determination result;

changing a display to an image of the keyboard for receiving an input of a next character after determining the input character; and determining that authentication is OK when all held determination results are correct in connection with all characters that form the password.

18. The programmable storage medium according to claim 17, wherein:

said program further causes the computer to execute storing the respective characters that form the password and the order of the respective characters arranged in the password in the computer, which storing is executed before said displaying the image of the keyboard;

said receiving an input of a position is receiving one time the input of the position on the screen where the image of the keyboard is displayed;

said specifying a character is specifying the character in the image of the keyboard corresponding to the position input in said receiving an input of a position, as one input character;

said program fit causes the computer to execute reading one character in the password arranged in the same order as the number of times receiving an input of a position is executed;

said holding a determination result checks one specified input character against the read one character in the password to determine whether the input character matches the character in the password and holds a determination result as being positive when a match exists; and wherein said receiving one time the input of the position, said specifying the input character, said reading one character of the password, and said holding the determination result are executed in the order of the respective characters that form the password, thereby obtaining the determination results of all characters that form the password.

19. A programmable storage medium tangibly embodying a program causing a computer to execute a sequence comprising:

displaying an image of a keyboard including multiple character keys;

receiving an instruction input of a position on a screen where the image of the keyboard is displayed;

specifying one or multiple characters corresponding to the position input by one input operation as an input character/characters in connection with the displayed keyboard;

checking the specified input character/characters against a character/characters in collation unit that forms/form a password to determine whether the input character is correct and holding a determination result;

changing a display to an image of the keyboard for receiving an input of a next one or multiple characters after determining the input character; and determining that authentication is OK when all held determination results are correct in connection with all characters that form the password.

20. The programmable storage medium according to claim 19, wherein:

said program further causes the computer to execute storing the respective character/characters in collation unit that forms/form the password and the order in collation units of the respective character/characters in collation unit in the computer, which storing is executed before said displaying the image;

said receiving an instruction input of a position is receiving the position input by one input operation on the screen where the image of the keyboard is displayed;

said specifying one or multiple characters is specifying one or multiple characters in the image of the keyboard corresponding to the position input by one input operation in said receiving an instruction input of a position, as one pair of the input characters;

said program further causes the computer to execute reading the character/characters in the password in collation unit arranged in the same order in the collation units as the number of times said receiving an instruction input of a position is executed;

said holding a determination result checks one pair of the specified input characters against the read character/characters in the password in collation unit to determine whether one pair of the input character/characters matches the character/characters of the password in collation unit, and holds a determination result as being positive when a match exists; and said receiving the instruction input of the position, said specifying one pair of the input character/characters, said reading the characters of the password in collation unit, and said holding the determination result are executed in the order in collation units of the character/characters in collation units that forms/form the password, thereby obtaining the determination results of all characters that form the password in collation unit.

* * * * *